(12) United States Patent
Hurst et al.

(10) Patent No.: US 10,320,770 B2
(45) Date of Patent: Jun. 11, 2019

(54) ACCESS CONTROL SYSTEM

(71) Applicant: BRITISH TELECOMMUNICATIONS PUBLIC LIMITED COMPANY, London (GB)

(72) Inventors: Christopher Edwin Hurst, London (GB); Gurmohinder Takhar, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 141 days.

(21) Appl. No.: 15/115,332

(22) PCT Filed: Jan. 13, 2015

(86) PCT No.: PCT/GB2015/050051
§ 371 (c)(1),
(2) Date: Jul. 29, 2016

(87) PCT Pub. No.: WO2015/114307
PCT Pub. Date: Aug. 6, 2015

(65) Prior Publication Data
US 2017/0012965 A1 Jan. 12, 2017

(30) Foreign Application Priority Data
Jan. 31, 2014 (EP) ..................................... 14250014

(51) Int. Cl.
*H04L 29/06* (2006.01)
*G06F 21/41* (2013.01)
(52) U.S. Cl.
CPC .......... *H04L 63/0815* (2013.01); *G06F 21/41* (2013.01); *H04L 63/083* (2013.01);
(Continued)
(58) Field of Classification Search
CPC .................................................. H04L 63/0815
See application file for complete search history.

(56) References Cited

U.S. PATENT DOCUMENTS

| 2002/0184507 A1 | 12/2002 | Makower et al. |
| 2008/0320576 A1 | 12/2008 | Curling |

(Continued)

FOREIGN PATENT DOCUMENTS

| WO | WO 01/11452 | 2/2001 |
| WO | WO 02/082296 | 10/2002 |

(Continued)

OTHER PUBLICATIONS

International Search Report for PCT/GB2015/050051, dated Mar. 12, 2015, 4 pages.
(Continued)

*Primary Examiner* — Simon P Kanaan
(74) *Attorney, Agent, or Firm* — Nixon & Vanderhye P.C.

(57) ABSTRACT

An access control system is provided to provide a core server to authenticate the permissions of users to access services provided by other operators. The provision of a single core server allows many-to-many access agreements to be mediated and maintained for effectively than by operating individual one-to-one access permissions. This allows updates to access permissions to be handled by the operator responsible for the user or service in question, without the need to directly co-operate which each and every service involved. When an access attempt is made through a user interface (10) to access a service provided by another user (20), the service provider (21) refers the request to a core server (30) for authentication, and the core server (30) instructs the user to identify an identity provider (32) with which he is authenticated (step 63). Details provided by the user may be stored by the core server (30) for one or more subsequent uses. The core server (30) will permit or suspend access according to the response received from the identity provider (32). Because the authentication check (450, 451) is made by the identity provider (11) associated with the user (10), the user identity's permissions are under a single control and can be readily updated, or deleted as necessary, for all services by modifying the user profile store (16), (Continued)

regardless of how many different servers those services are hosted on. Similarly, if a service provider (25) requires amendment of the permissions granted to members of a particular enterprise (for instance to provide a new service, or because a subscription has expired), it can do so by sending an instruction to the core to amend the user profile store (16) in respect of all users (12) associated with a flag indicative of their association with that enterprise (11).

15 Claims, 5 Drawing Sheets

(52) U.S. Cl.
CPC ...... *H04L 63/0823* (2013.01); *H04L 63/0861* (2013.01); *H04L 63/0892* (2013.01); *H04L 63/20* (2013.01)

(56) References Cited

U.S. PATENT DOCUMENTS

| | | |
|---|---|---|
| 2010/0122333 A1 | 5/2010 | Noe |
| 2011/0246765 A1 | 10/2011 | Schibuk |
| 2012/0151568 A1 | 6/2012 | Pieczul et al. |

FOREIGN PATENT DOCUMENTS

| | | |
|---|---|---|
| WO | WO 2007/068716 | 6/2007 |
| WO | WO 2009/122162 | 10/2009 |

OTHER PUBLICATIONS

Written Opinion of the ISA for PCT/GB2015/050051, dated Mar. 12, 2015, 5 pages.

ACCESS CONTROL SYSTEM

This application is the U.S. national phase of International Application No. PCT/GB2015/050051 filed 13 Jan. 2015, which designated the U.S. and claims priority to EP Patent Application No. 14250014.9 filed 31 Jan. 2014, the entire contents of each of which are hereby incorporated by reference.

BACKGROUND AND SUMMARY

This invention relates to access control systems for communications systems, and in particular for information-sharing services.

In recent times businesses have begun to require more control and oversight of their relationships with their customers, partners, supply chain, value chain and the market ecosystem or community in which they operate. This has been reinforced by systemic regulation e.g the "Dodd Frank" Act (Wall Street Reform and Consumer Protection Act) of 2010 in the United States of America, and equivalent legislation in other jurisdictions.

An important aspect of this requirement is the ability to self-organise securely, such that the organisation can have a consistent identity in its interactions with other organisations with which it is in communication.

However, tightly-coupled application architectures impose a set of compromises on the ability to work between different organisations, and limit flexibility and responsiveness. Moreover, applications and processes are impeded by necessary security requirements when they are made available beyond the boundaries of the organisation providing them. Dealing with these conflicts is important to the success of the enterprise in the market ecosystem.

The present invention provides the ability to define a secure unified identity for individuals, roles, organisational units and cross-organisational teams, to allow information to be shared between users in different organisations in a controlled, reliable and convenient way.

In prior art systems, an example of which is described in International Patent Application WO2007/068716 (IBM), a mesh of technical agreements is required between the individual organisations, for example code-of-connection contracts formed through the bilateral exchange of metadata. This then requires access control systems to be set up between each pair of organisations to ensure data and services are only accessible by, and supplied by authorised personnel of the organisations concerned, requiring each entity to set up and maintain a profile with each other entity with which it is to operate. This arrangement is not readily scaleable.

Such systems are difficult to use, as a user has to navigate the individual security gateway of each service provider in order to access its services. Personnel changes are difficult to track, as each organisation that has access to the services of other organisations has to inform all the other organisations of any changes in personnel, and in particular changes to their authority to access the services.

According to the invention there is provided an authentication server for controlling access to a plurality of service provision systems by a plurality of service user systems, comprising
    a first interface for communicating with the service user systems,
    a second interface for communicating with the service provision systems,
    a store for maintaining authorisation concordances between the service user systems and the service provision systems,
    an identification system for requesting and receiving data from each user terminal, by way of the first interface, indicative of the respective service user system with which it is associated,
    a mediating system for mediating responses between user terminals and service provision systems to generate authorisation for access to predetermined service user systems, and
    transmission means to forward authentication data to the service provision systems by way of the second interface.

The invention also provides a data access system comprising an authentication server having the features specified above, in combination with at least one service provision edge unit arranged to control access to a plurality of data services under its control and at least one identity provision edge unit arranged for service user identity management to control access to a plurality of data services by service users under its control, wherein the service provision edge units are configured to forward requests for service made by service users to the authentication server and to receive authentication confirmation from the authentication server, and the identity provision edge units are configured to respond to identity requests from the authentication server by initiating an authentication process with the service user making the request, and reporting the outcome of the authentication process to the authentication server.

The invention also provides a method of authenticating access requests to a plurality of service provision systems made by a plurality of service user systems, wherein
    access requests are transmitted by user terminals to service provision systems,
    and forwarded by the service provision systems to an authentication server,
    and for each request forwarded by a service provision system, the authentication server identifies a service user system associated with the user terminal making the request, and communicates with the associated service user system to verify the authenticity of the user terminal,
    if verification is successful, the authentication server transmits a verification of the access request to the service provision system from which the request was forwarded, to authorise the access request made by the user terminal to the service provision system The identification of the service user entity associated with the user may be initially performed by a challenge and response process, and the association thus identified is maintained in a concordance store for a predetermined duration to facilitate subsequent access requests initiated by the same user terminal.

Attributes of service users can be stored by the authentication server for use by the service provision systems, the shared authentication server filtering the attributes to be transmitted in response to service requests, such that attributes necessary for fulfilment of a service request are transmitted to the respective service provider, and attributes not necessary for fulfilment of the service request are omitted.

When the authentication server initiates an authentication process between a service user system and an individual user of the service, it may receive authentication confirmation from the service user system, and forward the authentication confirmation to the service provider.

The provision of such a shared authentication server allows the individual service providers and users to be organised as a federated group. Any number of user domains (also referred to herein as Identity Providers or IdP's) and service providers (SP's)) can interoperate multi-laterally, without compromising organisational security or exposing personally identifiable information. The invention operates by arranging that each user has a unique definition of identity and profile, whose validity can be recognised by all servers in the federated group through the medium of the shared authentication server.

In contrast to the multitude of bilateral agreements required to operate existing systems, the present invention makes it possible for each service (application) provider to require just one technical agreement with the shared authentication core server, instead of separate agreements with each organisation in a community. Similarly, each user organisation can operate with just one technical agreement with the Federation Core server, instead of one with each Service provider. An organisation may, of course, operate as both service provider and as a user of other services.

The invention uses the user identity as its central organising principle, by ensuring that each user has a unique definition of identity and profile. The federated context means that any number of user domains (IdP's) and service providers (SP's) can interoperate multi-laterally, without compromising organisational security or exposing personally identifiable information.

Attestation tools can be provided for members of the community to conduct regular attestation of the users for which they are responsible, and their profiles. Attestation provides a starting point from which each member's attested users can confirm other users' identities, so that communication with other users and service providers can be conducted securely.

BRIEF DESCRIPTION ON THE DRAWINGS

An embodiment of the invention will now be described, with reference to the drawings, in which.

DETAILED DESCRIPTION OF PRESENT EXAMPLE EMBODIMENTS

It should be understood that the functional elements depicted in the Figures may in practice be embodied in software running on a general-purpose computer, to perform the access control functions.

Figure 1:
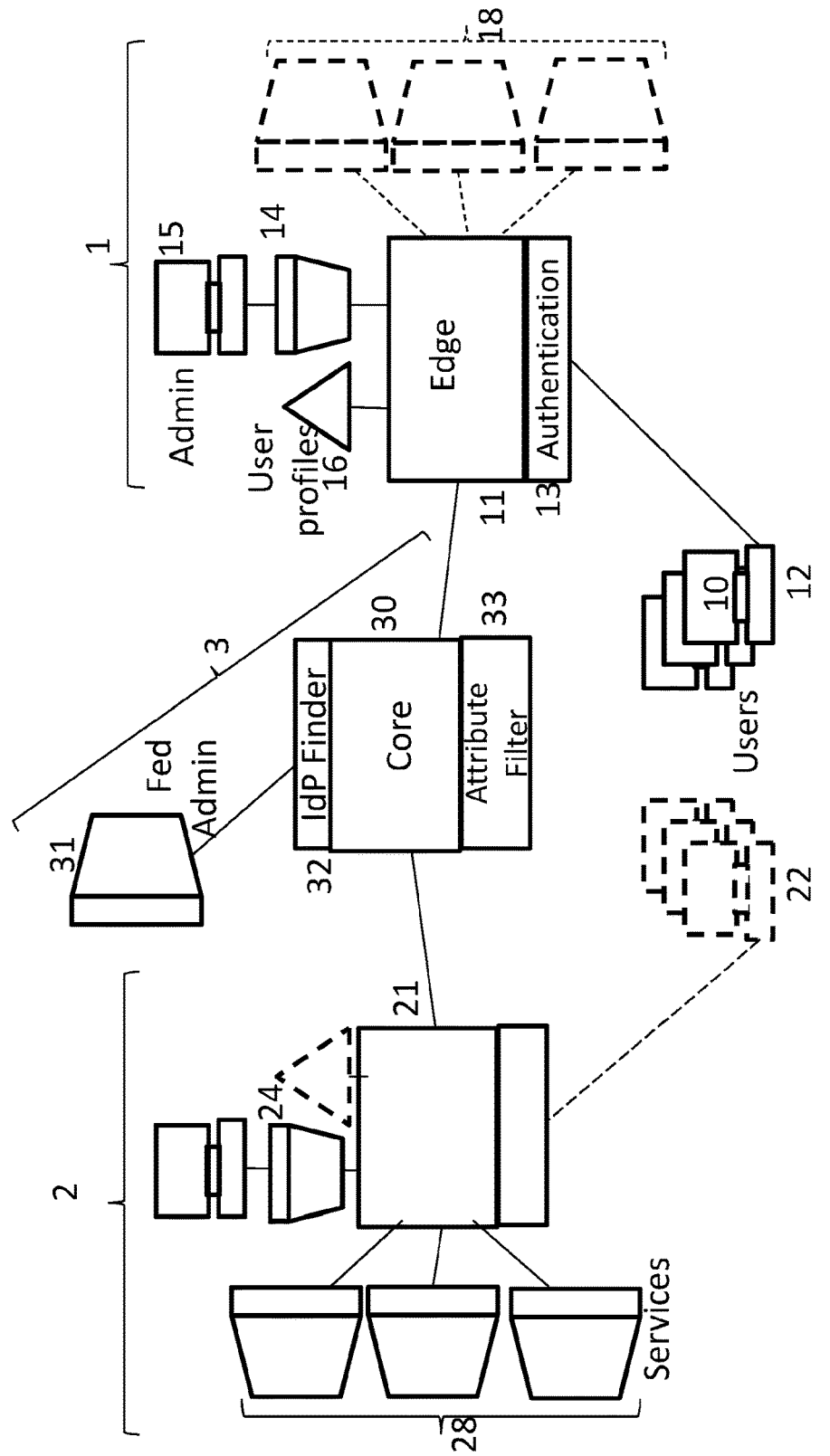
FIG. 1 depicts a communications system suitable for operation according to the invention.

FIG. 1 depicts a number of interconnected enterprise systems 1, 2, of which one system 1 is shown in detail, comprising an "edge" server 11 through which a number of individual user terminals 12 may communicate with each other, or access applications 18, through an authentication interface 13. An administration processor interface 14 allows a user 15 with special access permissions to manage the authentication interface 13. Individual user profiles are maintained in a store 16.

The other enterprise systems (e.g. enterprise system 2) are configured similarly, and will not be discussed in detail except where necessary to describe the interactions between such systems. Individual elements are designated by reference numerals corresponding to those of the first system 1, with reference numerals for the corresponding elements beginning with "2" instead of "1".

Individual enterprise users may operate as Identity Providers (IdP), which manage the users, or as service Providers (SP) which manage the services that the users use. An individual user may be authorised to act in both roles, but the two functions are handled and authenticated separately.

Each user application 12 is controlled by a user through a user interface 10. Users within an individual enterprise can use the server 11 to access data 18 from elsewhere in the same enterprise. As the interactions are mediated by a single server 11 and the data and user access permissions (read-only, read-write, etc) are all controlled by the same administrative functions 14, 15, then, once a user application 12 has passed the authentication barrier 13, all locally controlled data can be made available to that user.

However, controlling communication between users 12, 22, or between users 12 and applications 27, in different enterprises 1, 2 is more complex.

For the purposes of this description, an interaction will be described between a user 10, 12 affiliated to a first system 1, referred to as the "identity providers" and a service 25 provided by a second system 2, referred to as a "service provider". The identity providers being given access to data maintained by the service providers, e.g read-only, data entry, read/write, etc. However, it should be understood that some entities may act in both roles. In the description to follow the user 1 is operating as an Identity provider for users 10, and the user 2 as a service provider with services 25: the corresponding elements (users 20 in the second system 2, and services 18 in the first system 1, both shown in dotted outline) do not take part in the particular interaction to be described, and indeed need to be present if the respective systems are only, respectively, providers of, and users of, the services.

Conventionally, if user terminals 12 in one enterprise 1 are to be given access to services 25 provided by another enterprise 2, an access control system is arranged by the service provider 2 to ensure that the user requesting access is authorised to access the data. This is generally on a "challenge and response" basis, for example requiring the user to submit a password. The identities of the authorised users may be notified to the service provider 2 by an administrative function 15 of the user's system 1, or the service provider may supply the users with the access credentials to be used.

However, it is more difficult to maintain the access permissions up to date when the identity provider 1 and the service provider 2 to be accessed are not controlled by the same server. For example, if an individual user leaves the organisation through which he derives his access rights to one or more service providers, all those service providers need to update their permissions so as to deny access to that user, and this in turn requires the user's network operator 15 to inform them all individually.

Each user may be given their own account with the service provider. However, this requires each user to set up the account himself, and for the service provider to be kept aware of who is entitled to use such an account. Alternatively, an organisation may have a single account with a service provider, to which all its members have access. In that case the service provider does not need to know of changes in personnel but, every time someone ceases to have permission to access the service provider, the access control system (i.e. the password) for the organisation from which he derived that permission has to be updated, and everyone else in that organisation who is still permitted to access the service needs to learn a new password.

In either case, every time there is a personnel change in any of the organisations, all the others have to be notified so that they can update the permissions in their access control systems (either to delete or add identities to the permissions, or to change the password). It is difficult to arrange for this to happen reliably. In particular, any delay in actioning such changes in permissions is an opportunity for misuse of the system by persons who are about to be denied access to the system.

Similarly, if an organisation ceases to subscribe to a particular data source, that source must update its permissions so as to deny access to all the users associated with that former subscriber.

According to the present invention, the access permissions are handled by a core server 30. As part of the establishment of the federated community, the functions and endpoints of the identity providers (e.g 1) and service providers (e.g 2) are described by each organisation's federation administrator (e.g 14, 24) to the core server 30. This technical description can be contained in metadata using the Security assertion markup Language (SAML). Business profile data can be configured at various levels within the system, and can be linked to events and actions via attribute assertions. Organisations can incorporate attributes maintained in the process of cascaded authorisations and attestations, and the attributes can be sourced from the user profile 16, other enterprise sources, the Core server 30 or the Edge server 11.

Figure 2:
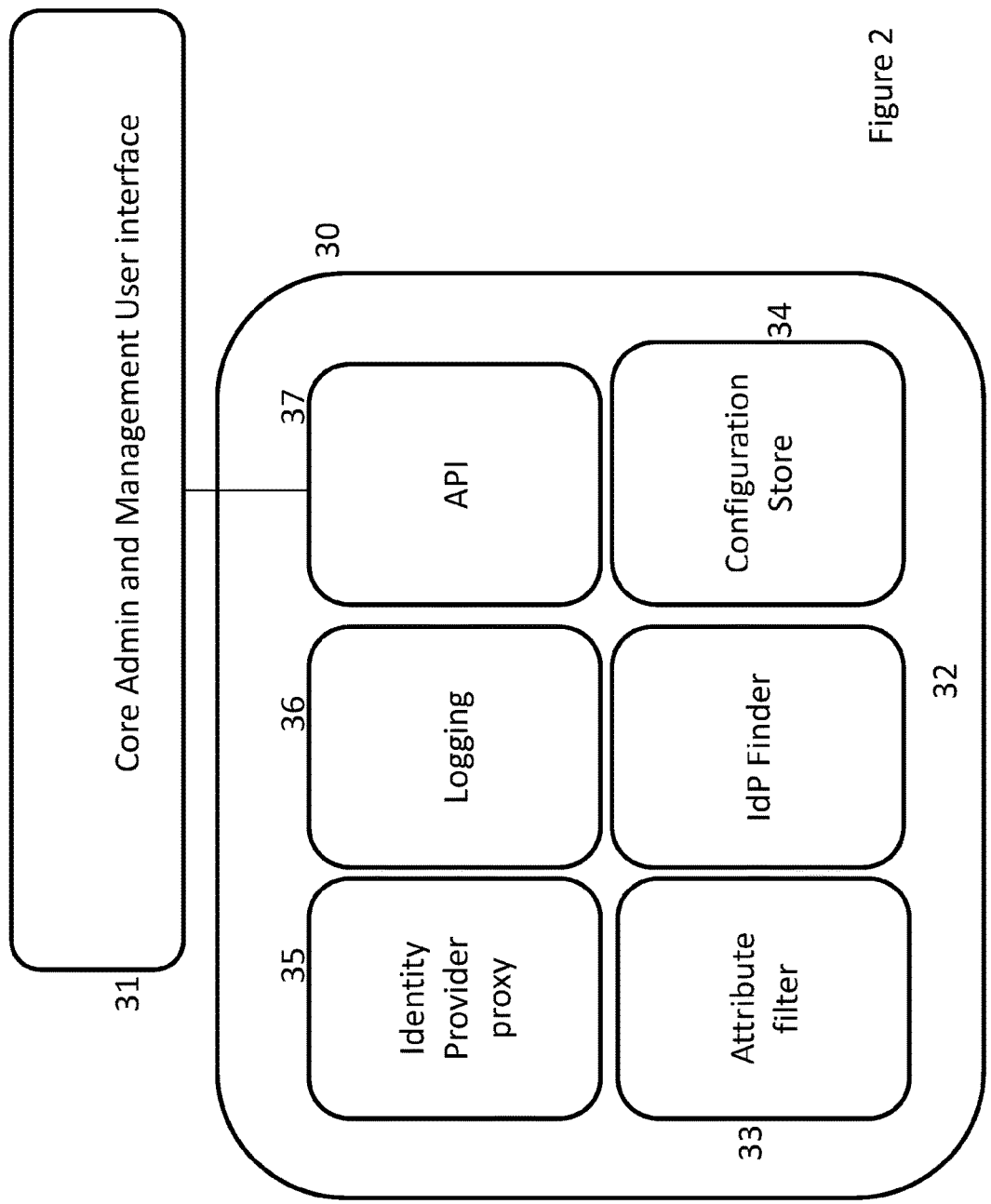
FIG. 2 is a schematic representation of a core server forming part of the communications system of FIG. 1, indicating the functional elements which co-operate to perform the invention.
Figure 3:
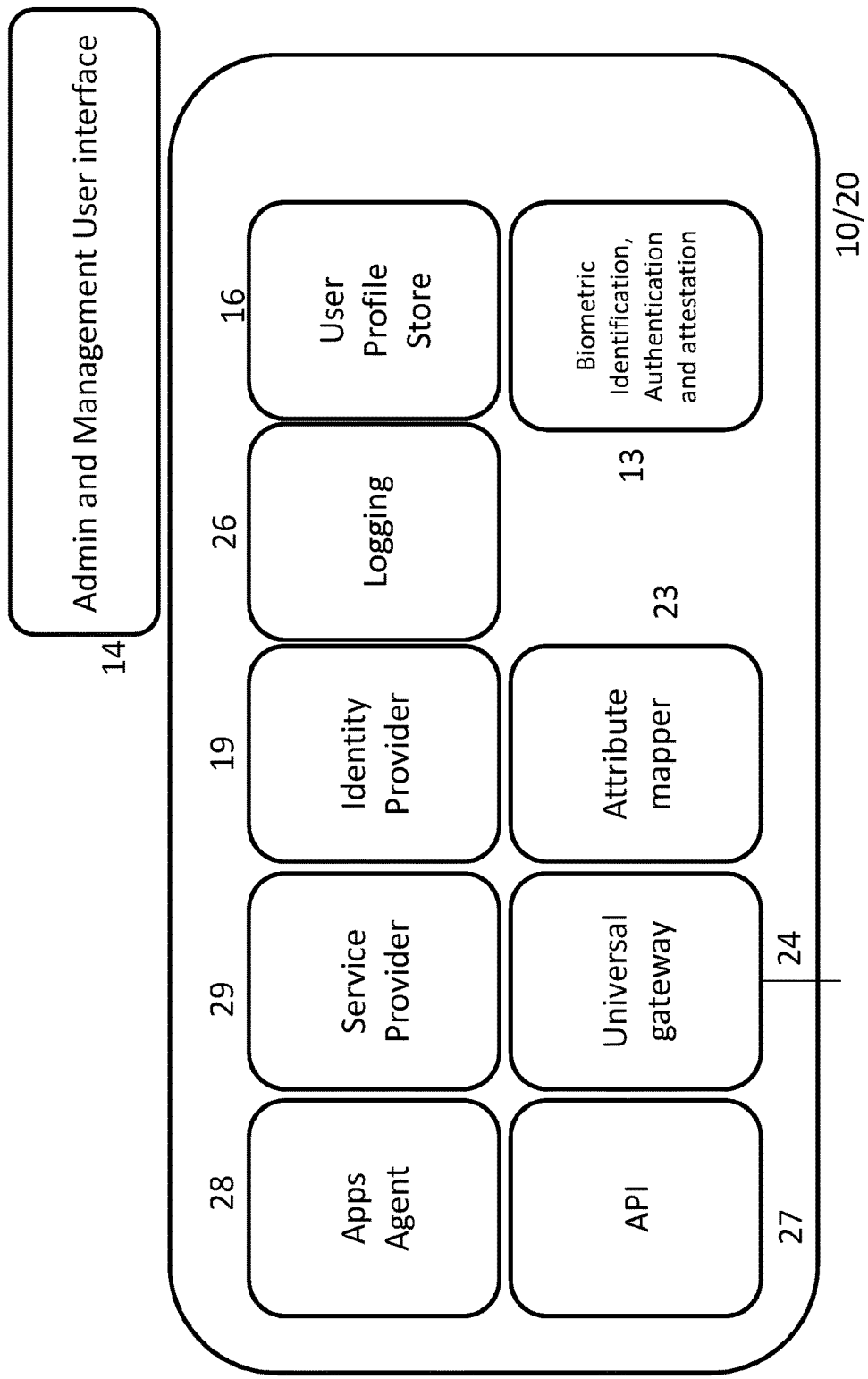
FIG. 3 is a schematic representation of an edge server forming part of the communications system of FIG. 1, indicating the functional elements which co-operate to perform the invention.

FIG. 2 depicts the core server 30 in more detail, whilst FIG. 3 depicts an edge server 11.

As shown in FIG. 2, the core server 30 comprises a number of inter-related functional elements, typically embodied as software. An application programming interface 37 allows a user 31 to configure the other elements manually, for example to add a new edge server 11 to the system.

An Identity Provider finding function 32 interacts with individual users 12 seeking access to the system through an edge server 11 to identify the individual user. A configuration store 34 maintains a database of permissions allowed to the individual edge server 11 through which the user is connecting, or to individual users 10 etc.

The service providers are accessed through a proxy system 35 arranged to generate an authorised proxy account having credentials that can be recognised by the target service provider 20. The use of the proxy makes it unnecessary for the service provider 20 to directly check the credentials of the user, and therefore does not need to maintain an up to date record of authorised users. The service provider only needs to recognise that the request has come from the authorised proxy 35: and it is arranged that requests can only be generated by the proxy 35 if the core server has checked the credentials of the user making the request.

Individual services may require data on certain attributes of the users in order to provide those services efficiently. The identity provider proxy 35 can retrieve these attributes from the configuration store 34. However, it is often neither necessary nor desirable, for all user attributes to be made available to all service providers. An attribute filter 33 function identifies the user attributes needed to operate the service being requested, removes those attributes not required, and may also re-format the user data if the service provider requires it to be presented in a particular way (e.g date formats, financial data in dollars or in cents, etc).

Other components typically include a logging function 36 to record what access attempts are made.

The proxy server 35 handles service requests and an assertion relay service, using digital signature and validation. In this process SAML messages are signed with the sender's certificate, and receivers only accept SAML messages with valid signatures. The IdP proxy validates and re-signs the SAML requests, artefact and response assertions The Core server 30 can be configured to add its own namespace attributes into an assertion. This is used to relay the identity of the authenticating Identity Provider and its associated organisation as attributes. In order to administer the functioning of the core server 30 a special instance 31 of the edge servers is provided, which operates as both a user identity and a service provider under the control of the administrator, and provides access control to an administrative user interface 37. User authorisation to access the administration application is controlled by registering the Admin interface application in the core 3. It is only accessible by authenticated users from the Core's Federation Edge server 31.

FIG. 3 depicts in schematic form the functional elements provided in a typical edge appliance operating in co-operation with the core server 30. Users and services are presented to the community system through respective Federation Edge appliances 10, 20. A Federation Edge appliance is provided wherever users or services are located, to perform identity management functions necessary to manage a member organisation in the federated community.

As shown in FIG. 3, each edge server 11, 21 comprises a number of inter-related functional elements, typically embodied as software. FIG. 3 shows the edge server as having the functional elements 13, 16, 19 to operate as an identity provider 10 and the elements 23, 28, 29 to operate as a service provider 20, as in general an edge system may operate in either or both roles. However, individual servers may be configured to specialise as only an identity provider or only a service provider.

As depicted in FIG. 3, each such edge appliance comprises functional elements for controlling identity provider 19, and/or service provision functions 28, 29, a user profile store 16, attribute mapping function 23, administration configuration management, and authentication capabilities 13. Administration is controlled through an interface 14 and access to users through a gateway function 24.

Business managers can place, update and delete selected users' profiles in the user profile store 16. By confining access to services to be only available through the core server, which in turn can only be accessed through the edge server, access permissions to all the services can be controlled by the administrator of the organisation to which the user belongs, and can access permissions can thus be reliably and promptly updated when a change is necessary.

An Attribute Mapper 23 is provided to enable differences in attribute nomenclature or formatting to be addressed by the member organisation. This means that if the organisation ascribes a telephone number internally to a literal name of "cell #", this can be mapped to an assertion name of "mob no" and so on. Similarly, differences between the way personal names are presented (surname first or last, with or without title, etc) can be handled.

The service provider's edge server 20 and its application agents control access to applications provided by the service provider, ensuring users are authenticated and authorised. The service provider acts as the policy decision point for multiple application agents. The application agent is installed on the application's container or web server and acts as a policy enforcement point for the access policies configured and held in the service provider. It may also supply attribute values to the application, from the SAML assertion or from the SP, in the form of HTTP headers or cookies.

A number of authentication techniques may be used, including certificate, biometric, and username/password techniques, and different authentication methods may be used for different service/user pairs. The modular nature of the system allows customised authentication modules to be developed where required. Authentication modules may be chained to provide for multiple methods of authentication.

Individual messages to and from the Core server 30 may be secured for example by using certificates. Each edge and core uses two certificates: one certificate is used for secure socket layer to encrypt communications channels and the other for signing SAML2.0 requests/assertions. Signatures are validated before accepting any message. Attestation provides a relying party with assurance that the user is authentic in the context of an organisation—that is to say not only that the user is using access criteria valid for that organisation, but that he is currently authorised to use those access criteria.

The identity provider server 11 maintains a store 16 of user profiles to support the identity provider function 19. An application programming interface 27 allows an administrator to configure the other elements manually through an interface 14, for example to update the user profiles 16.

User access control is managed by an authentication system 13, which may use biometric identification, password control etc.

The service provider function 29 is supported by an applications agent 28 for managing the interfaces with the individual applications 25.

Other components common to both identity providers and service providers typically include a logging function 26 to record what access attempts are made The edge servers 11, 21 each communicate with the core server through a respective gateway 24.

Once a user organisation 1, 2 has been registered with the core system 3 using the admin functions 14, 24, its users can seek access to other systems that are already registered with the system, and other systems can seek access to it. However, the individual users' access permissions remain under the control of the respective organisations with which they are associated. Thus each service provider can use its administration interface 24 to control what data is authorised for sharing, and each identity provider can use its own administration interface 14 to control access to the shared data.

Each member organisation retains the responsibility for its own users, and the applications it places into the system. Each organisation assures the identity of its users using a chain of attestation maintained by its own administrator 14.

The end user's profile or credentials are not held by the core 30, but are held, referenced and controlled by the user's own organisation, which controls the authentication process. The choice of authentication methods remains in the control of the organisation with which the user is associated, and each organisation also controls the release of its respective users' identities and attribute data. This data can be securely communicated as signed assertions, passed via the Federation Core 30 using encrypted channels.

Similarly, access to each service and application is under the control of the provider of that service, and each service provider can set appropriate authorisation levels for its services or applications.

Requests and artefacts are passed via the user's browser, while assertions are fetched via "SOAP" (Simple Object Access Protocol) channels. A flow diagram of the SAML assertions relay service is outlined in FIG. 4, which also indicates in simplified form the major elements taking part in the process.

The technical links connecting the Federation Core 30 with both the Identity Providers 11 and service providers 20 are managed by each provider's federation edge administrator 14, 24. Each administrator is given privileged access so that it is the only way in which a user can be enabled to gain access to servers operated by other members of the federation, or in which a service provider can be enabled to be accessed by other members of the federation. Thus the validity of both the services made available to users, and the users given access to those services, can be verified through the core server.

The Identity Provider server 11 deals with the authentication of the users, the provision of attributes from identity profile stores and generation of assertions. The assertions are of two types: authentication and attribute. Both types are presented to the Service Provider server 21 via the Federation Core 30 for determination of the user's entitlement and authorisation to access a service.

Each domain will typically have a single identity provider, but the edge server 30 may be used to isolate or extend segments of the user base in terms of identity profile (attributes) by using multiple user profile stores, to provide different classes of user with access to different services.

The core server 30 provides an attribute mapping function which permits attributes of individual users to be mapped to literal descriptors.

The service provider 21 controls access to services 25 etc based on criteria such as the entitlements of roles/users, and the required authentication level, based on attribute values received from the core server.

By using the mediation of the core server, a Single-Sign-On (SSO) process can be securely achieved for the user. Once authenticated with the core server 3, a user 12 has initiated a session between his browser and the core server 3, through which all services 28 etc accessible through the edge server 3 for which he is authorised can be accessed.

The Federation Core 30 is depicted in FIG. 2 and comprises a number of functional elements. Its principal function is as an identity proxy server 35, enabling secure federations between organisations and the Core to be created in a neutral environment between federating organisations. The Federation Core holds the map of all the identity providers and service providers that are members of the community ecosystem.

An identity provider finder function 31 is used to establish an association between an individual user and an authorised server. When a user attempts to connect to a federated service for the first time, the identity provider detects that the user is not currently authenticated and challenges the user to identify its home identity (1). The user responds with the identity of its home identity provider 1 and may select a "remember" function which arranges that, if the authentication succeeds, the user will not need to re-enter the same details on subsequent logins, until prompted to refresh the decision after a certain time or number of login attempts have elapsed.

Once an authenticated session has been established, the user can perform a 'single-sign-on' (SSO) to enterprise or cloud services that are accessible from within the federated community and for which they and their organisation are authorised. The single sign-on capability remembers the IdP Finder decision, and uses the authenticated federation session to generate assertions for the user accessing other federated services.

The core server 30 also operates an Attribute Filter 33 which ensures that only user attributes required by a service provider are delivered to that service provider. This allows confidential or personal information about the user to be limited to only those service providers e.g 20 that need it. For example, a user's bank account details may be provided by the core server only to those service providers authorised to take automated payments for their services. The administrator 32 manages the list of attributes required by each of their applications 25, and which organisations 1 are authorised to use them. Where connection is attempted to a service provider whose administrator has not authorised connection from the user's identity provider, all attributes are filtered out.

The core server 30 may also provide facilities such as dynamic attribute name mapping to match the requirements of the service provider protecting the application being accessed.

Figure 4:
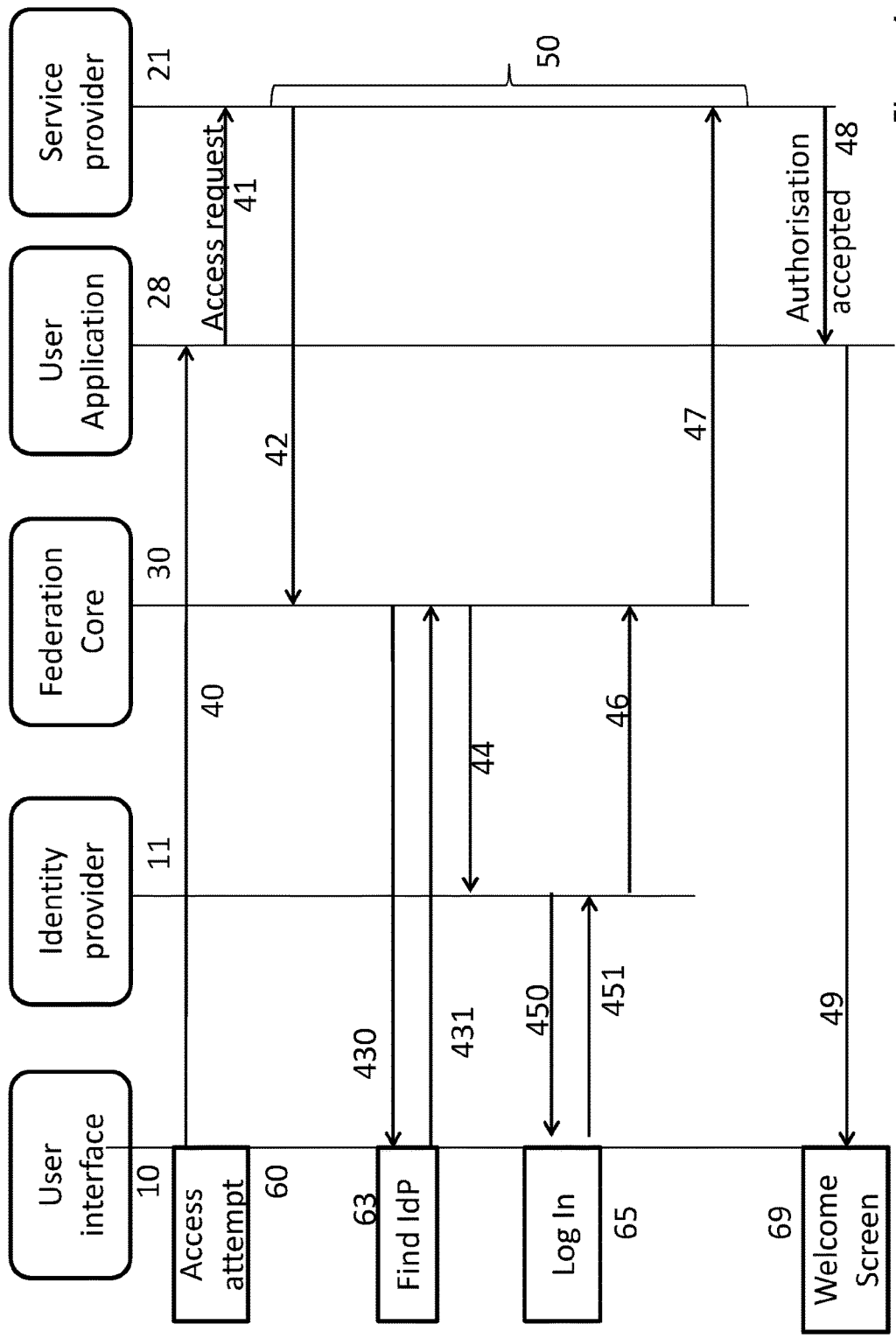
FIG. 4 is a sequence diagram depicting the exchange of data in a process according to the invention.
Figure 5:
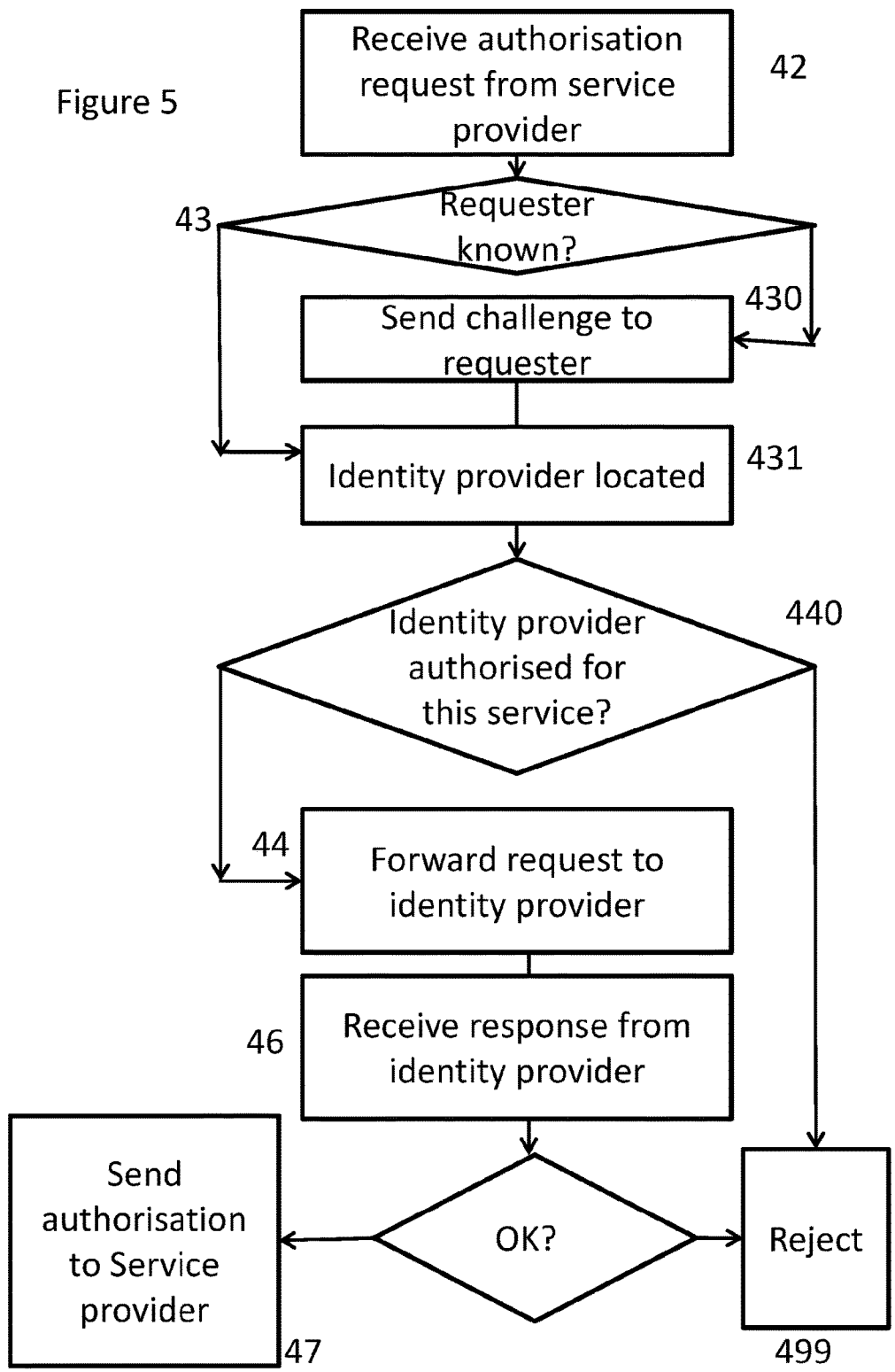
FIG. 5 is a flow chart illustrating the operation of the core server.

The process used to operate this embodiment will now be described with reference to FIGS. 4 and 5. FIG. 4 is a sequence diagram illustrating the various message exchanges that take place in performing the invention, whist FIG. 5 illustrates the decision processes performed by the core server 30. A user, working through the user interface 10, initiates (60) an attempt 40 to access a service provided by another user 20. The user terminal 12 transmits the request 41 to the service provider 21, which refers the request to the core server 30 for authentication. The core server 30 transmits a message 430 to the user instructing the user to identify the identity provider 32 with which he is authenticated (step 63). The user provides the necessary details (431) which are returned to the core server 30. These details may be stored for one or more subsequent uses (subject to a limit defined by time and/or number of access requests), so that subsequent requests can be processed without the challenge step 430/431. The core server 30 will suspend the process (step 499) if the identity provider identified by the user (step 431) does not match the authorisations stored for the service requested (Step 440 FIG. 5).

The core server 30 then forwards the request 44 to the specified identity provider 11, which performs a challenge (450) and response (451) interaction (65) with the user 10 to verify that he is currently authenticated by the identity provider 11 to access services from the service provider 20. If the verification process is successful (the user passes the login process and is verified as being authorised for the service in question) the identity provider 11 reports the result of the authorisation to the core server 30 (step 46) which, if the result is positive, in turn transmits a report 47 to the service provider authorising access. The service provider 20 then opens the relevant application 48 on the user's browser 12 which transmits (49) the instructions to generate the welcome screen 69 to allow the user to operate it.

If the message 46 from the identity provider 11 reports a failure of the authorisation process the core server 30 generates a login failure message 499 which is forwarded to the user terminal 10 over the same route. This may allow a user multiple attempts (repeat from step 451)

Once a session with the application has been established, one or more subsequent communications between the user 12 and the application 21 can be carried out without further intervention by the Federation Core, so that the steps indicated by reference "50" in FIG. 4 are omitted on subsequent access attempts, until a predetermined time or number of service requests have elapsed, after which the full authentication process is repeated.

Because the authentication check 450, 451 is made by the identity provider 11 associated with the user 10, the user identity's permissions can be updated for all the services by modifying the user profile store 16, regardless of how many different servers those services are hosted on.

Similarly, if a service provider 25 requires amendment of the permissions granted to members of a particular enterprise (for instance to provide a new service, or because a subscription has expired), it can do so by sending an instruction to the core to amend the user profile store 16 in respect of all users 12 associated with a flag indicative of their association with that enterprise 11.

What is claimed is:

1. An authentication server for controlling access to a plurality of service provision systems by a plurality of service user systems, comprising
    a first interface for communicating with the service user systems,
    a second interface for communicating with the service provision systems,
    a store for maintaining authorisation concordances between the service user systems and the service provision systems,
    an identification system for requesting and receiving data from user terminals, by way of the first interface, indicative of the respective service user systems with which they are associated,
    a mediating system for mediating responses between user terminals and service provision systems to generate authorisation for access to predetermined service user systems, and
    transmission means to forward authentication data to the service provision systems by way of the second interface;
    the authentication server being configured to:
        receive request for services made by service users from at least one service provision edge server and forward authentication confirmation to the at least one service provision edge server, the at least one service provision edge server being configured to control access to a plurality of data services under its control;
        provide identity requests to at least one identity provision edge server which controls access to a plurality of data services by service users under its control, the at least one identity provision edge server being configured to respond to the identity requests from the authentication server by initiating an authentication process with the service user making the request; and
        receive an outcome of the authentication process from the at least one identity provision edge server.

2. An authentication server according to claim 1, wherein the identification system comprises a store for maintaining concordances between individual users and service user systems identified by the exchange of the identification data, such that one or more subsequent user interactions may be processed using the concordance data stored therein.

3. An authentication server according to claim 1, wherein the authentication server has a store for maintaining attributes of service users, and wherein the mediating system is arranged to transmit attributes for transmission to the service provision systems in response to service requests, wherein the mediating system has a filtering system to select attributes necessary for fulfilment of a service request to be transmitted to the respective service provider, and omit attributes not necessary for fulfilment of the service request.

4. An authentication server according to claim 1, wherein the authentication server has means for initiating an authentication process between a service user system and an individual user of the service, for receiving authentication confirmation from the service user system, and for forwarding the authentication confirmation to the service provider.

5. A data access system comprising:
an authentication server for controlling access to a plurality of service provision systems by a plurality of service user systems, the authentication server comprising
a first interface for communication with the service user systems,
a second interface for communication with the service provision systems,
a store for maintaining authorization concordances between the service user systems and the service provision systems,
an identification system for requesting and receiving data from user terminals, by way of the first interface, indicative of the respective service user systems with which they are associated,
a mediating system for mediating responses between user terminals and service provision systems to generate authorization for access to predetermined service user systems, and
transmission means to forward authentication data to the service provision systems by way of the second interface;
in combination with at least one service provision edge unit arranged to control access to a plurality of data services under its control and at least one identity provision edge unit arranged for service user identity management to control access to a plurality of data services by service users under its control, wherein the service provision edge units are configured to forward requests for service made by service users to the authentication server and to receive authentication confirmation from the authentication server, and the identity provision edge units are configured to respond to identity requests from the authentication server by initiating an authentication process with the service user making the request, and reporting the outcome of the authentication process to the authentication server.

6. A method of controlling access to a plurality of service provision systems by authenticating access requests made by a plurality of service user systems, wherein the method comprises:
access requests are transmitted by user terminals to service provision systems, and forwarded by the service provision systems to an authentication server,
and for each request forwarded by a service provision system, the authentication server identifies a service user system associated with the user terminal making the request, and communicates with the associated service user system to verify the authenticity of the user terminal,
if verification is successful, the authentication server transmits a verification of the access request to the service provision system from which the request was forwarded, to authorise the access request made by the user terminal to the service provision system,
in response to the verification, the service provision system initiates communication with the user terminal which made the access request to the service provision system;
at least on service provision edge server controls access to a plurality of data services under its control;
at least one identity provision edge server arranged for service user identity management controls access to a plurality of data services by service users under its control;
the service provision edge server forwards requests for service made by service users to the authentication server and receives authentication confirmation from the authentication server; and
the identity provision edge server responds to identity requests from the authentication server by initiating an authentication process with the service user making the request, and reports the outcome of the authentication process to the authentication server.

7. A method according to claim 6, wherein the identification of the service user entity associated with the user is initially performed by a challenge and response process, and the association thus identified is maintained in a concordance store for a predetermined duration to facilitate subsequent access requests initiated by the same user terminal.

8. A method according to claim 6, wherein attributes of service users are stored by the authentication server for use by the service provision systems, and wherein the authentication server filters the attributes to be transmitted in response to service requests, such that attributes necessary for fulfilment of a service request are transmitted to the respective service provider, and attributes not necessary for fulfilment of the service request are omitted.

9. A method according to claim 6, wherein the authentication server initiates an authentication process between a service user system and an individual user of the service, receives authentication confirmation from the service user system, and forwards the authentication confirmation to the service provider.

10. A non-transitory storage medium that stores a computer program or suite of computer programs executable by a processor to cause the processor to perform the method of claim 6.

11. An authentication server for controlling access to a plurality of service provision systems by a plurality of service user systems, comprising:
a first interface configured to communicate with the service user systems;
a second interface configured to communicate with the service provision systems;
storage memory storing authorisation concordances between the service user systems and the service provision systems; and
at least one hardware processor at least configured to:
request and receive data from user terminals, by way of the first interface, indicative of the respective service user systems with which they are associated;
mediate responses between user terminals and service provision systems to generate authorisation for access to predetermined service user systems, the generated authorisation for access controlling access to the plurality of service provision systems by the plurality of service user systems;

transmit authentication data to the service provision systems by way of the second interface;

receive requests for service made by service users from at least one service provision edge server and forward authentication confirmation to the at least one service provision edge server, the at least service provision edge server being configured to control access to a plurality of data services under its control;

provide identity requests to at least one identity provision edge server which controls access to a plurality of data services by service users under its control, the at least one identity provision edge server being configured to respond to the identity requests from the authentication server by initiating an authentication process with the service user making the request; and receive an the outcome of the authentication process from the service users systems.

12. An authentication server according to claim 1 further comprising storage memory storing concordances between individual users and service user systems identified by the exchange of the identification data, such that one or more subsequent user interactions may be processed using the concordance data stored therein.

13. An authentication server according to claim 1, further comprising storage memory storing attributes of service users, and
wherein the hardware processor is further configured to:
transmit attributes for transmission to the service provision systems in response to service requests
filter and select attributes necessary for fulfilment of a service request to be transmitted to the respective service provider, and omit attributes not necessary for fulfilment of the service request.

14. An authentication server according to claim 1, wherein the hardware processor is further configured to initiate an authentication process between a service user system and an individual user of the service, for receiving authentication confirmation from the service user system, and for forwarding the authentication confirmation to the service provider.

15. A data access system comprising:
an authentication server for controlling access to a plurality of service provision systems by a plurality of service user systems, including:
a first interface configured to communicate with the service user systems;
a second interface configured to communicate with the service provision systems;
storage memory storing authorisation concordances between the service user systems and the service provision systems; and
at least one hardware processor at least configured to:
request and receive data from user terminals, by way of the first interface, indicative of the respective service user systems with which they are associated;
mediate responses between user terminals and service provision systems to generate authorisation for access to predetermined service user systems, the generated authorisation for access controlling access to the plurality of service provision systems by the plurality of service user systems; and
transmit authentication data to the service provision systems by way of the second interface;
at least one service provision edge server configured to control access to a plurality of data services under its control; and
at least one identity provision edge server arranged for service user identity management to control access to a plurality of data services by service users under its control; wherein
the service provision edge server is configured to forward requests for service made by service users to the authentication server and to receive authentication confirmation from the authentication server; and
the identity provision edge server is configured to respond to identity requests from the authentication server by initiating an authentication process with the service user making the request, and reporting the outcome of the authentication process to the authentication server.

* * * * *